(12) United States Patent
Satomi

(10) Patent No.: US 12,108,226 B2
(45) Date of Patent: Oct. 1, 2024

(54) ECHO SUPPRESSION DEVICE, ECHO SUPPRESSION METHOD, AND ECHO SUPPRESSION PROGRAM

(71) Applicant: TRANSTRON INC., Kanagawa (JP)

(72) Inventor: Yuki Satomi, Kanagawa (JP)

(73) Assignee: TRANSTRON INC., Kanagawa (JP)

( * ) Notice: Subject to any disclaimer, the term of this patent is extended or adjusted under 35 U.S.C. 154(b) by 0 days.

(21) Appl. No.: 17/055,111

(22) PCT Filed: May 7, 2019

(86) PCT No.: PCT/JP2019/018247
§ 371 (c)(1),
(2) Date: Nov. 12, 2020

(87) PCT Pub. No.: WO2019/220951
PCT Pub. Date: Nov. 21, 2019

(65) Prior Publication Data
US 2021/0099797 A1 Apr. 1, 2021

(30) Foreign Application Priority Data
May 17, 2018 (JP) ................. 2018-095767

(51) Int. Cl.
*H04R 3/02* (2006.01)
*G10L 21/0208* (2013.01)

(52) U.S. Cl.
CPC ............ *H04R 3/02* (2013.01); *G10L 21/0208* (2013.01); *G10L 2021/02082* (2013.01)

(58) Field of Classification Search
CPC .................. H04R 3/02; G10L 21/0208; G10L 2021/02082
See application file for complete search history.

(56) References Cited

U.S. PATENT DOCUMENTS

| 6,522,746 B1 | 2/2003 | Marchok et al. | |
| 6,658,107 B1 * | 12/2003 | Sorqvist | H04B 3/21 379/406.05 |

(Continued)

FOREIGN PATENT DOCUMENTS

| JP | H11-74822 A | 3/1999 |
| JP | 2000-022603 A | 1/2000 |

(Continued)

OTHER PUBLICATIONS

WIPO, International Search Report for PCT/JP2019/018247, Jul. 30, 2019.

(Continued)

*Primary Examiner* — Daniel R Sellers

(57) ABSTRACT

There is provided an echo suppression device that allows adding a natural comfort noise even in an environment in which a change in ambient noise is large. An echo is removed from an input signal to generate an echo-removed signal, a noise signal included in the echo-removed signal is estimated to generate an estimated noise signal, and a noise signal included in the echo-removed signal is suppressed based on the estimated noise signal to generate a suppressed signal. A comfort noise is generated based on the estimated noise signal, and the comfort noise is superimposed on the suppressed signal.

4 Claims, 8 Drawing Sheets

(56) References Cited

U.S. PATENT DOCUMENTS

| | | | |
|---|---|---|---|
| 7,454,010 B1 * | 11/2008 | Ebenezer | G10L 21/0208 704/E21.004 |
| 8,767,974 B1 | 7/2014 | Lu et al. | |
| 9,392,365 B1 * | 7/2016 | Yang | H04M 9/082 |
| 2003/0078767 A1 | 4/2003 | Nayak | |
| 2008/0159560 A1 * | 7/2008 | Song | G10L 25/78 381/94.1 |
| 2011/0116644 A1 | 5/2011 | Beaugeant et al. | |
| 2012/0237048 A1 | 9/2012 | Barron | |

FOREIGN PATENT DOCUMENTS

| | | |
|---|---|---|
| JP | 2002-41100 A | 2/2002 |
| JP | 2002-169599 A | 6/2002 |
| JP | 2004-534263 A | 11/2004 |
| JP | 2008-287046 A | 11/2008 |

OTHER PUBLICATIONS

WIPO, Written Opinion for PCT/JP2019/018247, Jul. 30, 2019.
European Patent Office, Extended European Search Report for European patent Application No. 19803036.3, Mar. 16, 2021.
Japan Patent Office, Japanese Office Action for Japanese Patent Application No. 2018-095767, Dec. 7, 2021.

\* cited by examiner

ECHO SUPPRESSION DEVICE, ECHO SUPPRESSION METHOD, AND ECHO SUPPRESSION PROGRAM

TECHNICAL FIELD

The present invention relates to an echo suppression device, an echo suppression method, and an echo suppression program.

BACKGROUND ART

An echo suppression device to reduce an acoustic echo in a product incorporating a speaker and a microphone, for example, a headset for telephone conferencing or videoconferencing, an on-board communication device, and an intercom has been known.

Because the echo suppression device reduces overlapping parts between a voice from a transmitting side and a voice from a receiving side, the voice from the transmitting side becomes soundless and it is felt uncomfortable in some cases. Accordingly, the echo suppression device adds a comfort noise as a background noise to a signal in which the acoustic echo has been reduced.

Patent Document 1 describes an echo suppression device that generates a comfort noise according to a voice signal from which unnecessary components have been removed and adds it to the voice signal. The echo suppression device includes noise generating means, signal level analyzing means, varying means, and synthesizing means. The noise generating means generates a noise superimposed on the voice signal after the unnecessary components have been removed. The signal level analyzing means measures a signal power of the voice signal before the unnecessary components have been removed. The varying means varies a property of the noise generated by the noise generating means according to an analysis result by the signal level analyzing means and generates a comfort noise. The synthesizing means superimposes the comfort noise generated by the varying means on the voice signal after the unnecessary components have been removed.

Patent Document 2 describes a digital sound processing device that adjusts timbre of a background noise before and after a part from which a micro noise has been removed by non-linear processing means, and improves a feeling of tear of the voice.

CITATION LIST

Patent Document

Patent Document 1: JP 2000-022603 A
Patent Document 2: JP 2002-41100 A

SUMMARY OF INVENTION

Technical Problem

In the inventions described in Patent Documents 1 and 2, the comfort noise is generated based on a white noise signal. However, in an environment where a change in ambient noise is large, like the on-board communication device in a movable body, such as an automobile, the comfort noise based on the white noise signal has a magnitude and a timbre different from those of the actual ambient noise. This causes a problem that a user who hears a sound after the comfort noise has been added feels unnaturally.

The present invention has been made in the light of the circumstances, and an object of the present invention is to provide an echo suppression device, an echo suppression method, and an echo suppression program that can add a natural comfort noise even in an environment in which a change in ambient noise is large.

Solution to Problem

In order to solve the problem, an echo suppression device according to the present invention is, for example, provided in a transmitting side signal path that transmits an input signal input from a microphone of a terminal including a speaker and the microphone. The echo suppression device includes an echo removal unit, a noise estimation unit, a noise suppression unit, a comfort noise generation unit, and a superimposition unit. The echo removal unit is configured to remove an echo from the input signal to generate an echo-removed signal. The noise estimation unit is configured to estimate a noise signal included in the echo-removed signal to generate an estimated noise signal. The noise suppression unit is configured to suppress the noise signal included in the echo-removed signal based on the estimated noise signal to generate a suppressed signal. The comfort noise generation unit is configured to generate comfort noise based on the estimated noise signal. The superimposition unit is configured to superimpose the comfort noise on the suppressed signal.

The echo suppression device according to the present invention estimates the noise signal included in the echo-removed signal generated by removing the echo from the input signal to generate the estimated noise signal and generates the comfort noise based on the estimated noise signal. In other words, the comfort noise is generated based on an ambient noise of a sound picked up from the microphone. As a result, the natural comfort noise can be added even in an environment where a change in ambient noise is large.

Here, the echo suppression device may further include a converter and an inverse converter. The converter may be configured to convert the echo-removed signal into a function of a frequency domain. The inverse converter may be configured to convert a signal generated by the superimposition unit into a function of a time domain. The noise estimation unit may be configured to generate the estimated noise signal for each frequency band based on the echo-removed signal converted into the function of the frequency domain by the converter. The comfort noise generation unit may be configured to generate the comfort noise for each frequency band based on the estimated noise signal for each frequency band. This makes it possible to generate the comfort noise further close to a din in the environment.

Here, the comfort noise generation unit may be configured to treat the estimated noise signal reduced by a fixed amount in each frequency band as the comfort noise. Compared with a configuration that uses an estimated noise signal as a comfort noise as is, this configuration provides a satisfactory SN ratio and allows reducing an unclear voice signal due to an excessively big comfort noise.

Here, the comfort noise generation unit may be configured to treat the estimated noise signal reduced at a different proportion depending on each frequency band based on a SN ratio of the echo-removed signal of each frequency band as the comfort noise. This allows reducing the unclear voice signal due to the excessively big comfort noise. This allows the SN ratio of the input signal to be substantially constant over the wide frequency band, and therefore the natural comfort noise with less uncomfortable feeling can be generated.

Here, the superimposition unit may be configured to compare a magnitude of the suppressed signal with a threshold value based on the comfort noise for each frequency band. The superimposition unit may be configured to superimpose the comfort noise on the suppressed signal only in a frequency band in which the magnitude of the suppressed signal falls below the threshold value. As a result, the comfort noise can be superimposed only in the frequency band of a small power, and therefore only a required noise can be added while an entire sound volume of an output signal is suppressed. That is, while the uncomfortable feeling of the sound on which the comfort noise has been superimposed is reduced, the voice signal output from the echo suppression device can be further clear.

In order to solve the problem, an echo suppression method according to the present invention includes, for example, removing an echo from an input signal input from a microphone of a terminal including a speaker and the microphone; estimating a noise signal included in an echo-removed signal as a signal generated by removing the echo from the input signal to generate an estimated noise signal; suppressing the noise signal included in the echo-removed signal based on the estimated noise signal to generate a suppressed signal; generating a comfort noise based on the estimated noise signal; and superimposing the comfort noise on the suppressed signal.

In order to solve the problem, an echo suppression program according to the present invention is, for example, provided in a transmitting side signal path that transmits a signal input from a microphone of a terminal including a speaker and the microphone. The echo suppression program causes a computer to function as: an echo removal unit configured to remove an echo from the input signal to generate an echo-removed signal; a noise estimation unit configured to estimate a noise signal included in the echo-removed signal to generate an estimated noise signal; a noise suppression unit configured to suppress the noise signal included in the echo-removed signal based on the estimated noise signal to generate a suppressed signal; a comfort noise generation unit configured to generate a comfort noise based on the estimated noise signal; and a superimposition unit configured to superimpose the comfort noise on the suppressed signal.

Advantageous Effects of Invention

According to the present invention, the natural comfort noise can be added even in the environment in which the change in ambient noise is large.

BRIEF DESCRIPTION OF DRAWINGS

FIG. 4(a) is a power spectral density of a suppressed signal during silence, FIG. 4(b) is a power spectral density of a signal generated by superimposing a comfort noise on the suppressed signal during silence, FIG. 4(c) is a power spectral density of the suppressed signal while sound is present, and FIG. 4(d) is a power spectral density of a signal generated by superimposing the comfort noise on the suppressed signal while sound is present.

FIG. 6(a) is a power spectral density of a suppressed signal during silence, FIG. 6(b) is a power spectral density of a signal generated by superimposing a comfort noise on the suppressed signal during silence, FIG. 6(c) is a power spectral density of the suppressed signal while sound is present, and FIG. 6(d) is a power spectral density of a signal generated by superimposing the comfort noise on the suppressed signal while sound is present.

DESCRIPTION OF EMBODIMENTS

Embodiments of an echo suppression device according to the present invention will be described below in detail with reference to the drawings. An echo suppression device is a device suppressing echo generated during a telephone call in a voice communication system.

First Embodiment

Figure 1:
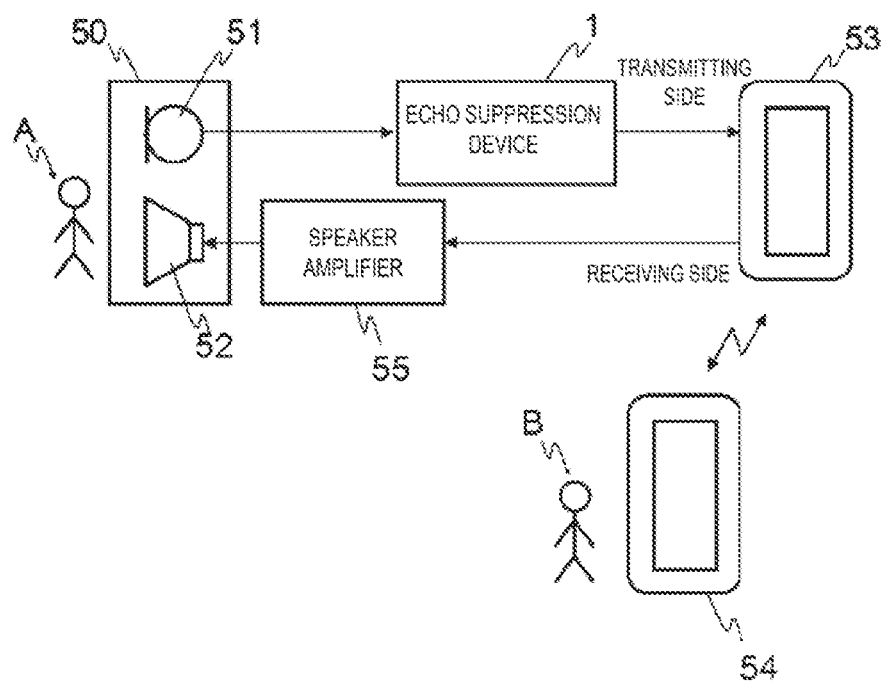
FIG. 1 is a diagram schematically illustrating a voice communication system 100 provided with an echo suppression device 1 according to a first embodiment.

FIG. 1 is a diagram schematically illustrating a voice communication system 100 provided with an echo suppression device 1 according to the first embodiment. The voice communication system 100 primarily includes a terminal 50 (for example, an on-board device, a conference system, and a mobile terminal) including a microphone 51 and a speaker 52, two cell phones 53 and 54, a speaker amplifier 55, and the echo suppression device 1.

The voice communication system 100 is a system in which a user (a user A on a near-end side) utilizing the terminal 50 (near-end terminal) is in voice communication with a user (user B on a far-end side) utilizing the cell phone 54 (far-end terminal). A voice signal input via the cell phone 54 is amplified and output by the speaker 52, and a voice emitted by the user on the near-end side is collected by the microphone 51 and transmitted to the cell phone 54. Thus, the user A can make an amplified voice call (hands-free call) without holding the cell phone 53. The cell phone 53 and the cell phone 54 are connected together by a general telephone line and mutually communicable.

The echo suppression device 1 is provided on a transmitting side signal path through which input signals input from the microphone 51 are transmitted from the terminal 50 to the cell phone 53.

The echo suppression device 1 may be configured as a dedicated board mounted on, for example, the terminal 50 in the voice communication system 100. Additionally, the echo suppression device 1 may include, for example, computer hardware and software (echo suppression program). The echo suppression program may be stored in advance in, for example, an HDD as a storage medium built into a device, such as a computer, and a ROM in a microcomputer including a CPU, and may be installed from it into a computer. Additionally, the echo suppression program may be temporarily or permanently stored (memorized) in a removable storage medium such as a semiconductor memory, a memory card, an optical disc, a magneto-optical disk, a magnetic disk, or the like.

Figure 2:
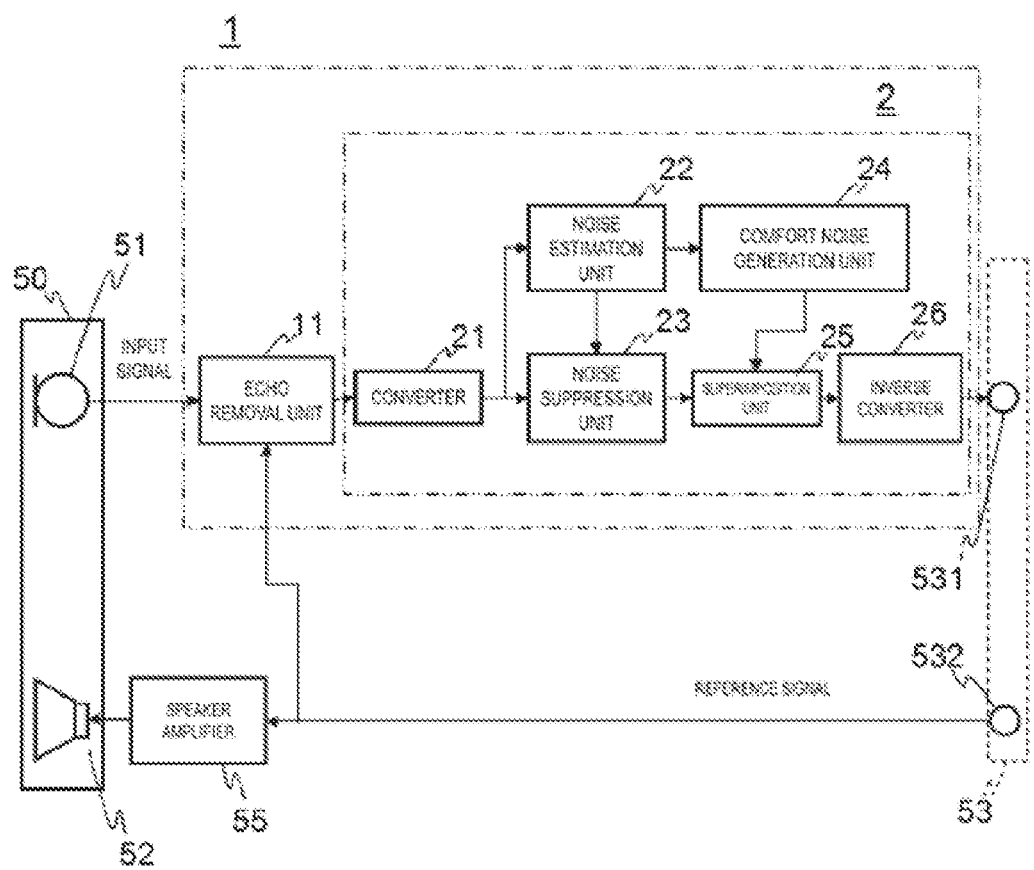
FIG. 2 is a block diagram illustrating a general configuration of the echo suppression device 1.

FIG. 2 is a block diagram illustrating a general configuration of the echo suppression device 1. The echo suppression device 1 is connected between the microphone 51 and a signal input end 531 on a transmitting side of the cell phone 53. In FIG. 2, an upper signal path is a transmitting side signal path through which input signals input from the microphone 51 are transmitted, and a lower signal path is a receiving side signal path through which signals are transmitted to the speaker 52.

The echo suppression device 1 primarily includes an echo removal unit 11 and a comfort noise addition unit 2.

The echo removal unit 11 is a function unit that removes an echo from the input signal picked up by the microphone 51. The echo removal unit 11 acquires the voice signal (reference signal) received by the cell phone 53, and removes the echo of the input signal based on the reference signal. For example, the echo removal unit 11 shifts a phase of the reference signal from the cell phone 53 by 180 degrees and synthesizes it with the input signal to remove the echo present in the input signal and generates an echo-removed signal.

The comfort noise addition unit 2 is a function unit that generates a comfort noise, superimposes the generated echo comfort noise on the echo-removed signal, and outputs it. The comfort noise addition unit 2 primarily includes a converter 21, a noise estimation unit 22, a noise suppression unit 23, a comfort noise generation unit 24, a superimposition unit 25, and an inverse converter 26.

The converter 21 is a function unit that converts the echo-removed signal from the echo removal unit 11 into a function of a frequency domain. An echo-removed signal x (t) expressed by a function of a time domain is input to the converter 21. When the voice signal included in the echo-removed signal x (t) is denoted as s (t) and a noise signal included in the echo-removed signal x (t) is denoted as n (t), the following Formula (1) is established.

[Formula 1]

$$x(t)=s(t)+n(t) \ (t: \text{time}) \tag{1}$$

The converter 21 converts both sides of Formula (1) into the function of the frequency domain. Formula (2) below is the result of converting Formula (1) into the function of the frequency domain.

[Formula 2]

$$X(\omega)=s(\omega)+N(\omega) \ (\omega: \text{frequency}) \tag{2}$$

While the converter 21 performs Fourier transformation on the echo-removed signal in the present embodiment, the echo-removed signal may be converted into the function of the frequency domain using a conversion method other than the Fourier transformation.

The noise estimation unit 22 and the noise suppression unit 23 are functional units that suppress a noise from the echo-removed signal to generate a suppressed signal. While the noise estimation unit 22 and the noise suppression unit 23 suppress the noise by spectrum subscription method in the present embodiment, this is an example.

Figure 3:
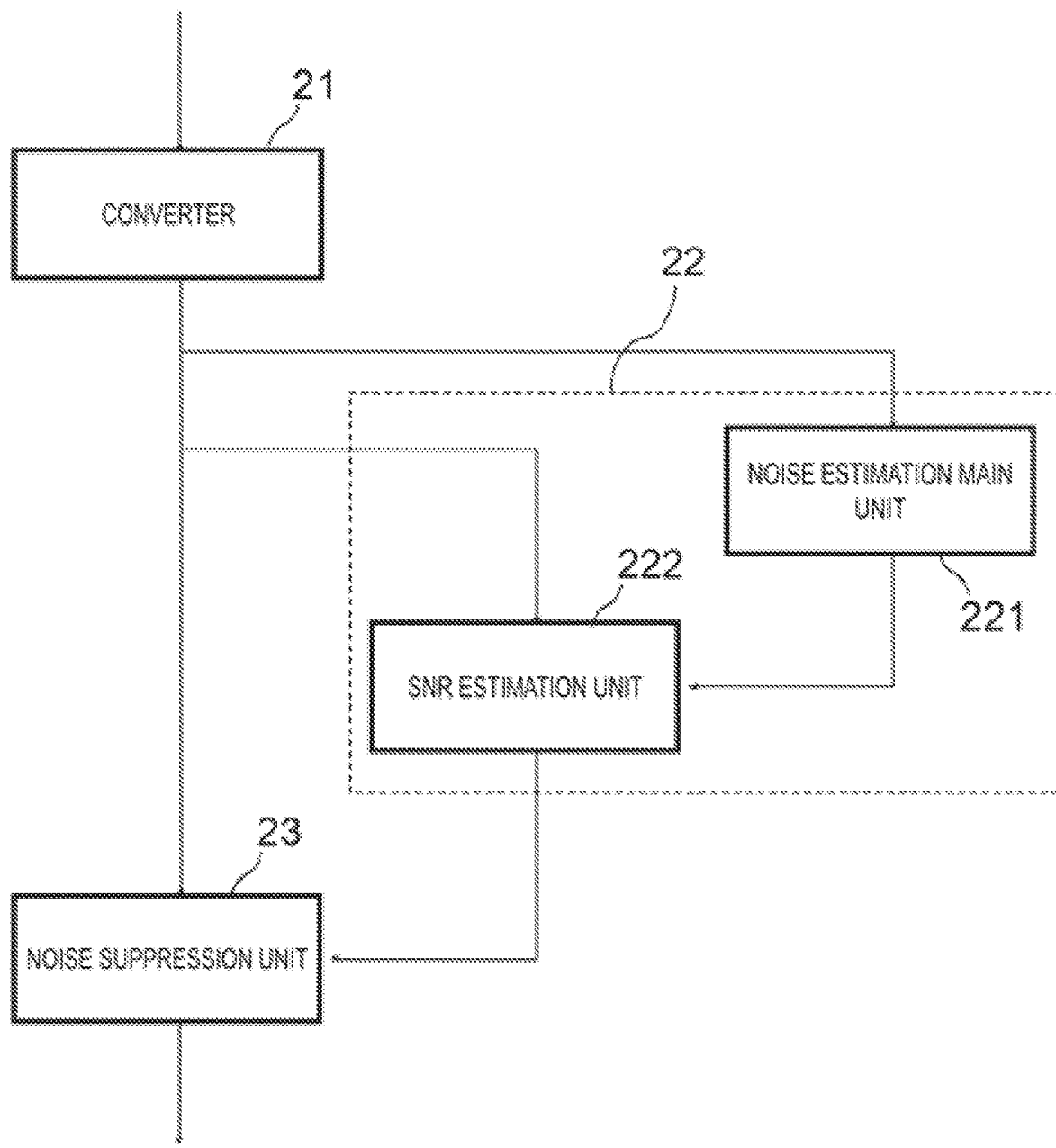
FIG. 3 is a functional block diagram of a noise estimation unit 22 provided with the echo suppression device 1.

FIG. 3 is a functional block diagram of the noise estimation unit 22 provided with the echo suppression device 1. The noise estimation unit 22 is a function unit that estimates a noise component included in the echo-removed signal converted into the function of the frequency domain, namely, an estimated noise signal, for each frequency domain. The noise estimation unit 22 includes a noise estimation main unit 221 and an SNR estimation unit 222.

The noise estimation main unit 221 is a function unit that estimates a power spectrum of the noise signal N (ω). First, the noise estimation main unit 221 defines a startup of the comfort noise addition unit 2 as a silent section, and sets an average value from the 4th to the 20th frames in the silent section as the power spectrum density of the noise signal during startup. The power spectrum density |N(ω, 0)| of the noise signal during startup is expressed by Formula (3).

[Formula 3]

$$|N(\omega, 0)|^2 = \frac{|X(\omega, 0)|^2 + |X(\omega, 1)|^2 + \cdots + |X(\omega, N-1)|^2}{N} \tag{3}$$

(N: frame)

Next, the noise estimation main unit 221 determines whether the power spectral density |X(ω, t)| of the echo-removed signal in the t-th frame is a silent section, namely, a section that includes only the noise signal, or a sound section, namely, a section that includes the voice signal and the noise signal. When the power spectral density |X(ω, t)| of the echo-removed signal in the t-th frame satisfies the following Formula (4) for a certain threshold value Thre, the noise estimation main unit 221 determines that the t-th frame is the silent section.

[Formula 4]

$$|X(\omega, t)|^2 < \text{Thre}^* |N(\omega, t)|^2 \tag{4}$$

When the t-th frame is the silent section, the power spectral density |N(ω, t+1)| of the t+1-th noise signal is expressed by Formula (5).

[Formula 5]

$$|N(\omega, t+1)|^2 = \alpha^*|N(\omega, t)|^2 + (1-\alpha)^*|X(\omega, t)|^2 \ (\alpha: \text{natural number of } 0<\alpha<1) \tag{5}$$

When the power spectral density |X(ω, t)| of the echo-removed signal in the t-th frame does not satisfy Formula (4), the noise estimation main unit 221 determines that the t-th frame is the sound section.

When the t-th frame is the sound section, the power spectrum density |N(ω, t+1)| of the noise signal in the t+1-th frame is expressed by Formula (6).

[Formula 6]

$$|N(\omega, t+1)|^2 = |N(\omega, t)|^2 \tag{6}$$

The SNR estimation unit 222 is a function unit that estimates an SN ratio of the echo-removed signal based on the power spectral density of the estimated noise signal estimated by the noise estimation main unit 221. The SN ratio, that is, a ratio ξ(ω) of the power spectral density of the voice signal to the power spectral density of the noise signal is expressed by Formula (7).

[Formula 7]

$$\xi(\omega) = \frac{|\hat{S}(\omega)|^2}{|\hat{N}(\omega)|^2} \tag{7}$$

Here, a relationship between the power spectral density X($\omega$) of the echo-removed signal and an estimated value of the power spectral density S ($\omega$) of the voice signal is expressed as in Formula (8).

[Formula 8]

$$\hat{S}(\omega)=G(\omega)X(\omega) \quad (8)$$

Solving Formulae (7) and (8) and performing a calculation assuming that the power spectral density X ($\omega$) of the echo-removed signal and the estimated value of the power spectral density S ($\omega$) of the voice signal each follow a Gaussian distribution, a Wiener filter as shown in Formula (9) is obtained.

[Formula 9]

$$G(\omega) = \frac{\xi(\omega)}{1+\xi(\omega)} \quad (9)$$

The SNR estimation unit 222 applies $\xi(\omega)$ expressed by the following Formula (10) using, for example, Decision-Directed method to Formula (9) to obtain the estimated value of the voice signal from the echo-removed signal.

[Formula 10]

$$\xi(l)=\beta\gamma(l-1)G^2(l-1)+(1-\beta)\cdot\max[\gamma(l)-1,0]\beta: \text{constant} \quad (10)$$

Here, $\gamma$ is a function expressed by Formula (11).

[Formula 11]

$$\gamma = \frac{|x|^2}{\sigma_n^2} \quad (11)$$

($\sigma_n^2$ is a variance of the noise signal)

The noise suppression unit 23 is a function unit that suppresses the noise signal in the echo-removed signal based on the power spectral density S ($\omega$) of the estimated noise signal estimated by the noise estimation unit 22 and generates the suppressed signal. The noise suppression unit 23 multiplies the power spectral density X ($\omega$) of the echo-removed signal by G ($\omega$) obtained by the noise estimation unit 22, that is, calculates Formula (8), to calculate the estimated value of the power spectral density S ($\omega$) of the voice signal.

The description will now return to FIG. 2. The comfort noise generation unit 24 is a function unit that generates the comfort noise based on the power spectral density of the estimated noise signal estimated by the noise estimation unit 22. In other words, the comfort noise generation unit 24 generates the comfort noise according to an environment where the user A is present. The comfort noise changes every moment in response to a change in the environment where the user A is present.

The comfort noise generation unit 24 generates the comfort noise for each frequency band based on the estimated noise signal estimated for each frequency region by the noise estimation unit 22. This makes it possible to generate the comfort noise further close to a din in the environment.

Additionally, the comfort noise generation unit 24 treats the estimated noise signal reduced by a fixed amount in each frequency band as the comfort noise. When the estimated noise signal is used as the comfort noise as is, since the comfort noise is too big and the voice signal becomes unclear, reducing the estimated noise signal and treating it as the comfort noise is desirable. For example, the amount to be decreased from the estimated noise signal during the generation of the comfort noise is approximately from 1 dB to 20 dB. As a result, it is possible to generate the comfort noise from the estimated noise signal by comparatively simple calculation, and thus a load of arithmetic processing on the comfort noise addition unit 2 can be suppressed.

The superimposition unit 25 is a function unit that superimposes the comfort noise on the suppressed signal generated by the noise suppression unit 23. The superimposition unit 25 adds the power spectral density of comfort noise to the power spectral density of the suppressed signal for each frequency region. In other words, the superimposition unit 25 superimposes both in the frequency domain.

The superimposition unit 25 superimposes only the comfort noise on the suppressed signal only in the frequency band in which the magnitude of the suppressed signal falls below the magnitude of the comfort noise. In other words, the superimposition unit 25 uses the power spectrum density of the comfort noise as the threshold value and superimposes the comfort noise of the corresponding frequency band on the power spectral density of the suppressed signal only in the frequency band in which the power spectral density of the suppressed signal falls below the power spectral density of the comfort noise.

Figure 4:
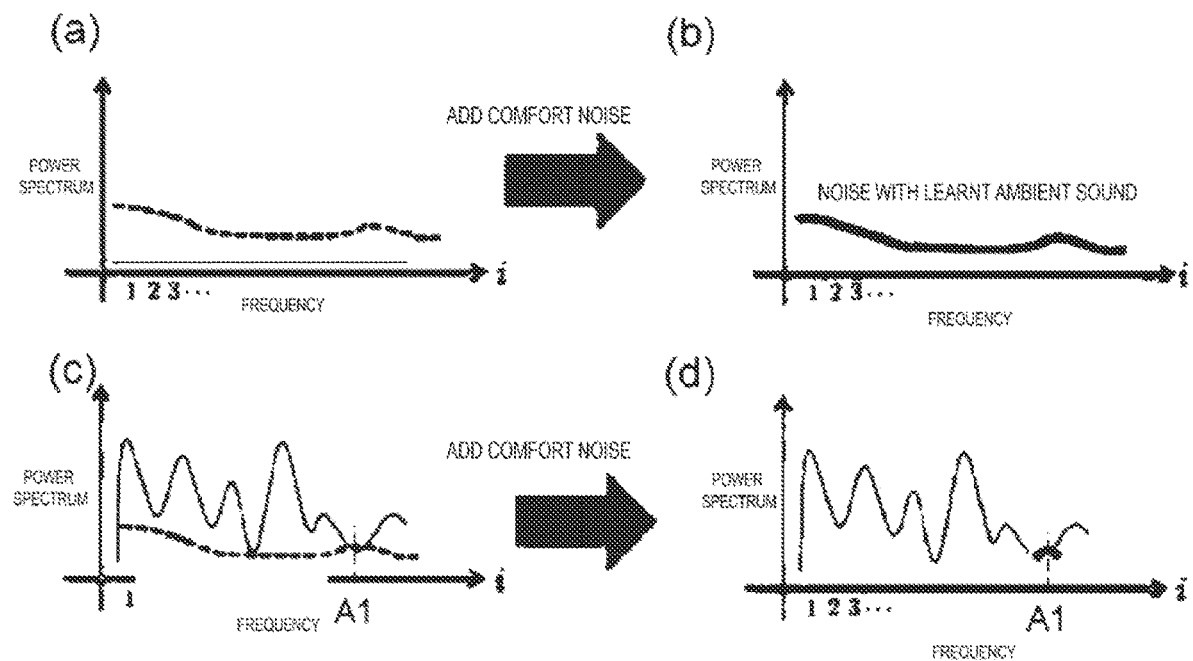
FIG. 4 is a diagram schematically illustrating a process performed by a superimposition unit 25.

FIG. 4 is a diagram schematically illustrating a process performed by the superimposition unit 25, FIG. 4(a) is the power spectral density of the suppressed signal during silence, FIG. 4(b) is the power spectral density of the signal generated by superimposing the comfort noise on the suppressed signal during silence, FIG. 4(c) is the power spectral density of the suppressed signal while sound is present, and FIG. 4(d) is a power spectral density of the signal generated by superimposing the comfort noise on the suppressed signal while sound is present. The dotted lines illustrated in FIG. 4(a) and FIG. 4(c) indicate the power spectral density of the comfort noise, and the solid lines indicate the power spectral density of the suppressed signal.

As illustrated in FIG. 4(a), the value of the power spectrum density of the suppressed signal is small in all frequency bands during silence. In other words, the power spectral density of the comfort noise is greater than the power spectrum density of the suppressed signal in all frequency bands. Accordingly, as illustrated in FIG. 4(b), the superimposition unit 25 superimposes the power spectrum density of the comfort noise on the power spectrum density of the suppressed signal in all frequency bands.

In contrast, while sound is present, the power spectral density of the frequency band in which the voice signal is present is greater than the power spectral density of the comfort noise. In the example illustrated in FIG. 4(c), at a frequency band A1, the power spectral density of the comfort noise is greater than the power spectrum density of the suppressed signal. Accordingly, as illustrated in FIG. 4(d), the superimposition unit 25 superimposes the comfort noise of the corresponding frequency band on the power spectrum density of the suppressed signal only in the frequency band A1.

In this manner, because the comfort noise of the corresponding frequency band is superimposed on the power spectral density of the suppressed signal only in the frequency band A1, the sound to which the comfort noise has been added can be a natural sound with less uncomfortable feeling.

Note that in the present embodiment, while the superimposition unit 25 uses the power spectrum density of the comfort noise as the threshold value and superimposes the comfort noise of the corresponding frequency band on the power spectral density of the suppressed signal only in the frequency band in which the power spectral density of the suppressed signal falls below the power spectral density of the comfort noise, the used threshold value is not limited to the power spectral density of the comfort noise. For example, the power spectrum density of comfort noise reduced by a fixed amount over the entire frequency band may be used as the threshold value. In other words, it is only necessary that the superimposition unit 25 compares the magnitude of the suppressed signal with the threshold value based on the comfort noise for each frequency band and superimposes the comfort noise on the suppressed signal only in the frequency band in which the magnitude of the suppressed signal falls below the threshold value.

Note that the superimposition unit 25 may superimpose the power spectral density of the suppressed signal on the power spectral density of the comfort noise over the entire frequency band. However, to make the sound to which the comfort noise has been added so as to be a natural sound with less uncomfortable feeling, it is desirable that the comfort noise of the corresponding frequency band be superimposed on the power spectral density of the suppressed signal only in the frequency band in which the power spectral density of the suppressed signal falls below the power spectral density of the comfort noise.

The description will now return to FIG. 2. The inverse converter 26 is a function unit that performs inverse transformation on the power spectrum density of the suppressed signal on which the comfort noise has been superimposed, and converts it into the function of the time domain. The inverse converter 26 performs inverse Fourier transformation, for example. An output signal of the time domain converted by the inverse converter 26 is input to the signal input end 531 on the transmitter side, and is transmitted to the cell phone 54 that the user B has via the cell phone 53.

Figure 5:
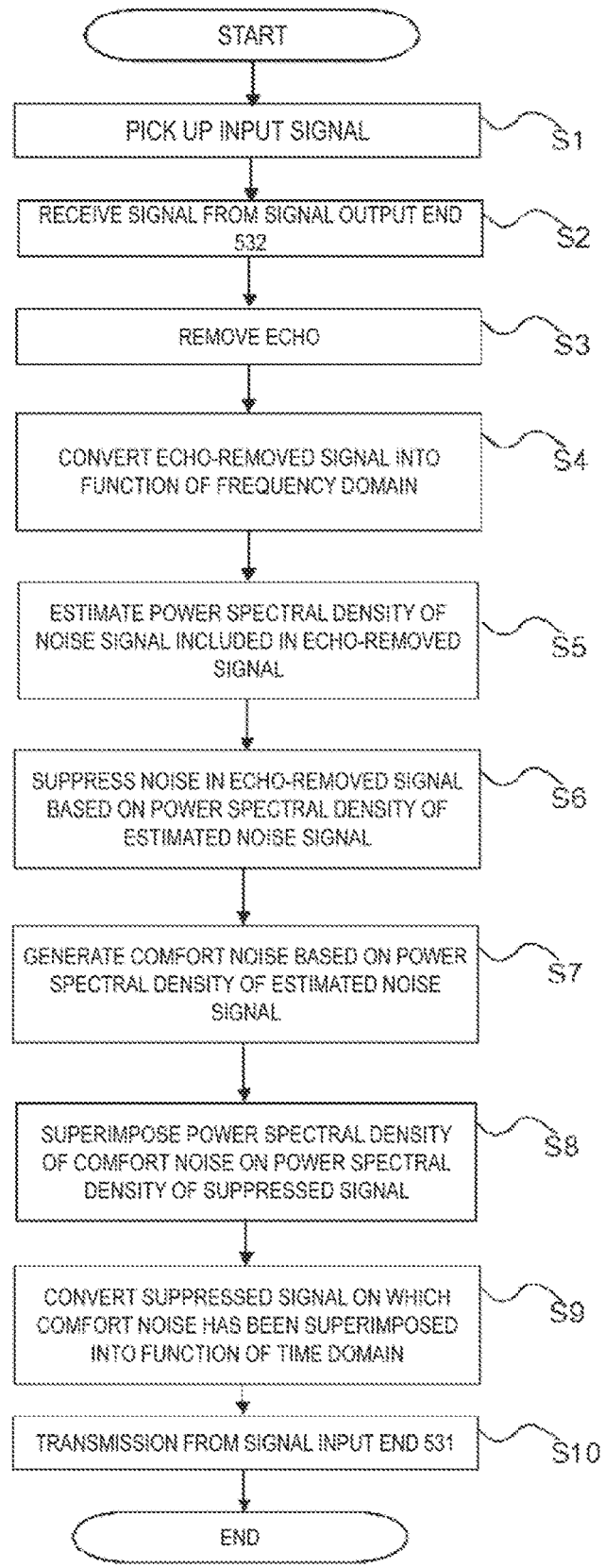
FIG. 5 is a flowchart depicting a flow of processes performed by the echo suppression device 1.

FIG. 5 is a flowchart depicting a flow of processes performed by the echo suppression device 1. Using FIG. 5, the flow of processes until the echo suppression device 1 removes the echo in the input signal that has been picked up and outputs the input signal with the comfort noise will be described.

First, the echo suppression device 1 picks up the input signal from the microphone 51 (step S1). Next, the echo suppression device 1 receives the reference signal from a signal output end 532 (step S2). Then, the echo removal unit 11 removes the echo in the input signal based on the reference signal from the signal output end 532 (step S3).

The converter 21 converts the echo-removed signal generated by removing the echo by the echo removal unit 11 into the function of the frequency domain (step S4).

Based on the power spectral density of the echo-removed signal obtained in step S4, the noise estimation unit 22 estimates the power spectral density of the noise signal included in the echo-removed signal (step S5).

The noise suppression unit 23 acquires the power spectral density of the estimated noise signal obtained in step S5 from the noise estimation unit 22, and suppresses the noise of the echo-removed signal acquired from the converter 21 based on the power spectral density of the estimated noise signal to generate the suppressed signal (step S6).

The comfort noise generation unit 24 generates the comfort noise based on the power spectral density of the estimated noise signal obtained in step S5 (step S7).

Next, the superimposition unit 25 superimposes the power spectral density of the comfort noise obtained in step S7 on the power spectrum density of the suppressed signal obtained in step S6 (step S8).

The inverse converter 26 converts the signal output from the superimposition unit 25 in step S8 into the function of the time domain (step S9). The signal converted into the function of the time domain in step S9 is output from the signal input end 531. The echo suppression device 1 repeatedly performs the processes described in steps S1 to S10.

According to the present embodiment, since the comfort noise based on the estimated noise signal, that is, the comfort noise according to the environment in which the user A is located is superimposed, it is possible to add the natural comfort noise with less uncomfortable feeling even in the environment in which the change in ambient noise is large. That is, the user B illustrated in FIG. 1 can hear the natural ambient noise on the user A side, with or without his/her speech.

In addition, according to the present embodiment, the superimposition unit 25 superimposes only the comfort noise on the suppressed signal only in the frequency band in which the magnitude of the suppressed signal falls below the magnitude of the comfort noise. Accordingly, the sound to which the comfort noise has been added can be a sound in which the voice of the user A is clear and without an uncomfortable feeling.

Figure 6:
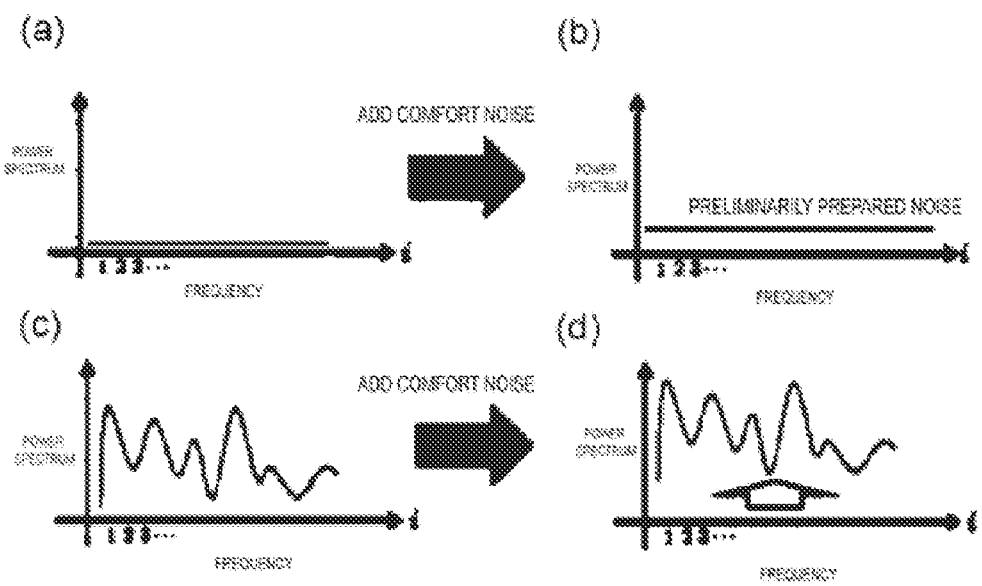
FIG. 6 is a diagram schematically illustrating a conventional comfort noise superimposition process.

FIG. 6 is a diagram schematically illustrating a conventional comfort noise superimposition process, FIG. 6(a) is a power spectral density of a suppressed signal during silence, FIG. 6(b) is a power spectral density of a signal generated by superimposing a comfort noise on the suppressed signal during silence, FIG. 6(c) is a power spectral density of the suppressed signal while sound is present, and FIG. 6(d) is a power spectral density of a signal generated by superimposing the comfort noise on the suppressed signal while sound is present. The dotted lines illustrated in FIG. 6(a) and FIG. 6(c) indicate the power spectral density of the comfort noise, and the solid lines indicate the power spectral density of the suppressed signal.

As illustrated in FIG. 6, the conventional echo suppression device superimposes the comfort noise on the suppressed signal in all frequency bands, regardless of the magnitudes of the suppressed signal and the power spectral density of the comfort noise. During silence as illustrated in FIG. 6(a), the comfort noise is output almost as is as illustrated in FIG. 6(b). In addition, the conventional echo suppression device superimposes the preliminarily prepared comfort noise in all frequency bands also while sound is present as illustrated in FIG. 6(c).

In other words, it is not necessary for the echo suppression device of the related art to perform the superimposition of the comfort noise on the suppressed signal in the frequency domain, and the suppressed signal and the comfort noise are added together in the time domain. As illustrated in FIG. 6(d), the power spectral density of the signal generated by superimposing the comfort noise on the suppressed signal increases in all frequency bands. As a result, the sound output from the echo suppression device is totally large and becomes an unnatural sound.

In contrast, in the present embodiment, the power spectrum density of the comfort noise is used as the threshold value, and only in the frequency band in which the power spectrum density of the suppressed signal falls below the power spectral density of the comfort noise, the comfort noise of the corresponding frequency band is superimposed on the power spectral density of the suppressed signal, and therefore the sound to which the comfort noise has been added can be the natural sound with less uncomfortable feeling.

Second Embodiment

In the first embodiment, the estimated noise signal reduced by the fixed amount in each frequency band is used as the comfort noise, but the configuration of the comfort noise is not limited to this. The second embodiment is a configuration in which the estimated noise signal reduced at a different proportion depending on each frequency band is used as the comfort noise. Now, an echo suppression device 1A according to the second embodiment will be described. Note that the same components as those of the echo suppression device 1 according to the first embodiment are denoted by the same reference numerals, and description of the components will be omitted.

Figure 7:
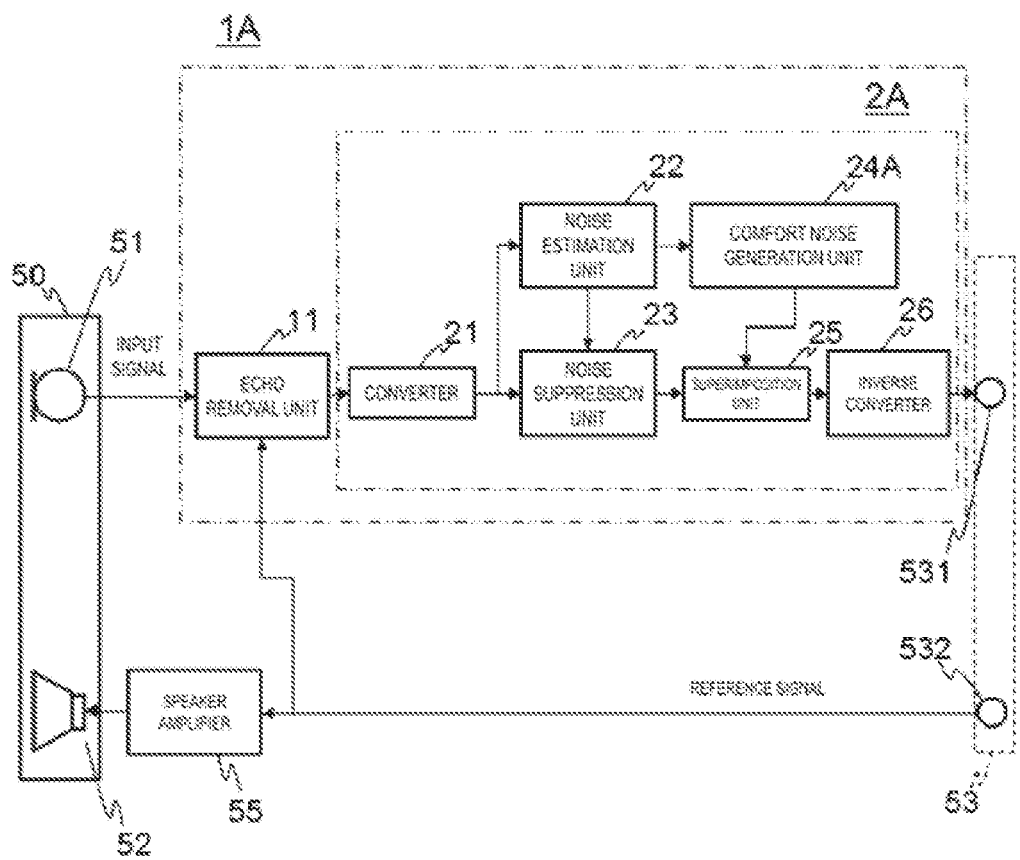
FIG. 7 is a block diagram illustrating a general configuration of an echo suppression device 1A.
Figure 8:
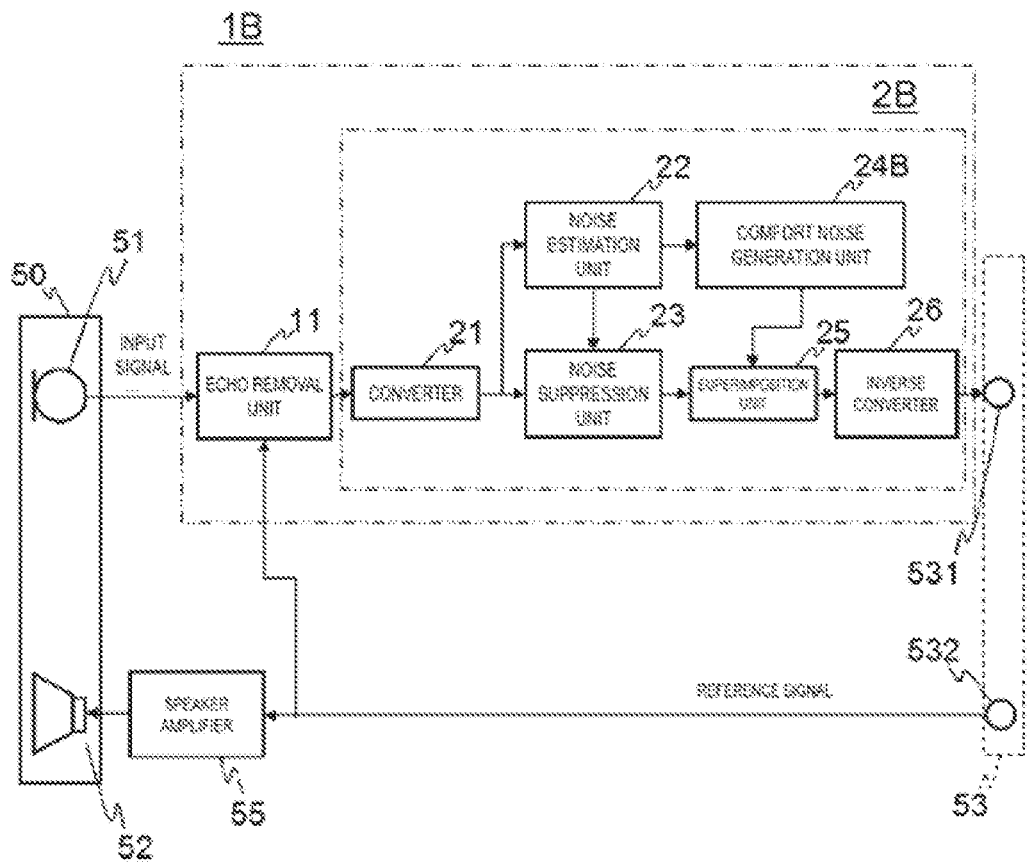
FIG. 8 is a block diagram illustrating a general configuration of an echo suppression device 1B.

FIG. 7 is a block diagram illustrating a general configuration of the echo suppression device 1A. The echo suppression device 1A primarily includes the echo removal unit 11 and a comfort noise addition unit 2A. The comfort noise addition unit 2A primarily includes the converter 21, the noise estimation unit 22, the noise suppression unit 23, a comfort noise generation unit 24A, the superimposition unit 25, and the inverse converter 26.

The comfort noise generation unit 24A treats the estimated noise signal reduced at the different proportion depending on each frequency band based on the SN ratio of the echo-removed signal of each frequency band as the comfort noise.

Specifically, the comfort noise generation unit 24A generates the comfort noise by multiplying the power spectral density of the estimated noise signal by a Wiener filter. In the frequency band in which the power spectral density of the noise signal is smaller than the power spectral density of the voice signal, the value of the Wiener filter is reduced, and the comfort noise becomes a comparatively small value. In the frequency band in which the power spectral density of the noise signal is greater than the power spectral density of the voice signal, the value of the Wiener filter increases, and the comfort noise becomes a comparatively large value.

This allows the SN ratio of the input signal to be substantially constant over the wide frequency band, output the natural comfort noise with less uncomfortable feeling, and output the voice signal more clearly.

In addition, because the comfort noise generation unit 24 generates the comfort noise using the filter used by the noise suppression unit 23, it is possible to generate the comfort noise by fewer processes than that of a configuration using another filter. In addition, because the configuration for suppressing a noise can also be used to generate the comfort noise, separately installing a memory for calculating and storing the comfort noise is unnecessary, and the comfort noise addition unit 2 can be a further simple configuration, for example, a low-cost and compact configuration.

However, the comfort noise generation unit 24 may suppress a noise using a filter different from the filter used by the noise suppression unit 23, namely, the Wiener filter. The echo-removed signals differ in the estimated amount of suppression between in the silence section and the sound section. Therefore, by the use of the filter different from the filter used by the noise suppression unit 23 by the comfort noise generation unit 24, an influence of the difference in the estimated result depending on the presence or absence of the voice signal is less likely to be received, and the further natural comfort noise can be generated.

Third Embodiment

In the first embodiment, the estimated noise signal reduced by the fixed amount in each frequency band is used as the comfort noise, but the configuration of the comfort noise is not limited to this. The third embodiment is a configuration that determines a level of the comfort noise based on an average value of the power spectral density of the estimated noise signal. Now, an echo suppression device 1B according to the third embodiment will be described. Note that the same components as those of the echo suppression device 1 according to the first embodiment are denoted by the same reference numerals, and description of the components will be omitted.

FIG. 7 is a block diagram illustrating a general configuration of the echo suppression device 1B. The echo suppression device 1B primarily includes the echo removal unit 11 and a comfort noise addition unit 2B. The comfort noise addition unit 2B primarily includes the converter 21, the noise estimation unit 22, the noise suppression unit 23, a comfort noise generation unit 24B, the superimposition unit 25, and the inverse converter 26.

The comfort noise generation unit 24B determines the level of the comfort noise based on the average value (hereinafter referred to as a noise level) of the power spectral density of the estimated noise signal. In a frequency in which the noise level is large, that is, the estimated noise level is large, the comfort noise generation unit 24 generates the comfort noise with the large level. In a frequency in which the noise level is small, that is, the estimated noise level is small, the comfort noise generation unit 24 generates comfort noise with the small level.

The following gives a description using a specific example. Under a loud environment, for example, when the noise level is 90 dB or more, the estimated noise signal in which −6 dB is applied is used as the comfort noise in each frequency band. Because the noise is dominant under the loud environment, the decibel number subtracted from the estimated noise signal is set to be smaller than that in other cases (described in detail later), and the comfort noise is increased. However, the decibel number subtracted from the estimated noise signal is not limited to −6 dB. In the environment in which the noise is dominant, a person sensitively feels a change in noise, so the decibel number subtracted from the estimated noise signal may be greater than −6 dB.

Under a quiet environment, for example, when the noise level is 50 dB or less, the estimated noise signal in which −20 dB is applied is used as the comfort noise in each frequency band. When the noise originally present is small, an uncomfortable feeling that occurs between the sound section and the silent section due to the echo suppression is small, so it is possible to sufficiently reduce the uncomfortable feeling by simply superimposing the small comfort noise. However, under the quiet environment, the noise is not dominant, and a person is insensitive to the change in noise. Accordingly, the decibel number subtracted from the estimated noise signal may be set to be −20 dB or more to further reduce the comfort noise, or the comfort noise may be set to 0.

Under an environment between the loud environment and the quiet environment, for example, when the noise level is from 50 dB to 90 dB, the estimated noise signal in which −12 dB is applied is used as the comfort noise in each frequency band. Here, the decibel number subtracted from the estimated noise signal only needs to be smaller than that in the loud environment and greater than that in the quiet environment, and is not limited to −12 dB.

The embodiments of the invention are described above in detail with reference to the drawings. Specific configurations are not limited to the embodiments and also include changes in the design or the like within a scope that does not depart from the gist of the invention.

REFERENCE SIGNS LIST

1 Echo suppression device
2 Comfort noise addition unit
11 Echo removal unit
21 Converter
22 Noise estimation unit
23 Noise suppression unit
24 Comfort noise generation unit
25 Superimposition unit
26 Inverse converter
50 Terminal
51 Microphone
52 Speaker
53 Cell phone
54 Cell phone
55 Speaker amplifier
100 Voice communication system
221 Noise estimation main unit
222 SNR estimation unit
531 Signal input end
532 Signal output end

The invention claimed is:

1. An echo suppression device, provided in a transmitting side signal path which transmits an input signal input from a microphone of a terminal including a speaker and the microphone, the echo suppression device, comprising:
an echo removal unit configured to remove an echo from the input signal to generate an echo-removed signal;
a converter configured to convert the echo-removed signal into a function of a frequency domain;
a noise estimation unit configured to estimate a noise signal included in the echo-removed signal to generate an estimated noise signal;
a noise suppression unit configured to suppress the noise signal included in the echo-removed signal based on the estimated noise signal to generate a suppressed signal;
a comfort noise generation unit configured to generate a comfort noise based on the estimated noise signal;
a superimposition unit configured to superimpose the comfort noise on the suppressed signal; and
an inverse converter configured to convert a signal generated by the superimposition unit into a function of a time domain,
wherein the noise estimation unit is configured to generate the estimated noise signal for each frequency band based on the echo-removed signal converted into the function of the frequency domain by the converter,
the comfort noise generation unit is configured to generate the comfort noise for each frequency band based on the estimated noise signal for each frequency band,
wherein the superimposition unit uses the comfort noise as a threshold value and superimposes the comfort noise on the suppressed signal only in a frequency band in which the magnitude of the suppressed signal falls below the comfort noise.

2. The echo suppression device according to claim 1, wherein the comfort noise generation unit is configured to determine a level of the comfort noise based on an average value of power spectral density of the estimated noise signal.

3. An echo suppression method, comprising:
removing an echo from an input signal input from a microphone of a terminal including a speaker and the microphone;
converting the echo-removed signal into a function of a frequency domain;
estimating a noise signal included in an echo-removed signal as a signal generated by removing the echo from the input signal to generate an estimated noise signal;
suppressing the noise signal included in the echo-removed signal based on the estimated noise signal to generate a suppressed signal;
generating a comfort noise based on the estimated noise signal;
superimposing the comfort noise on the suppressed signal,
converting a signal generated by a superimposition unit into a function of a time domain,
generating the estimated noise signal for each frequency band based on the echo-removed signal converted into the function of the frequency domain by the converter,
generating the comfort noise for each frequency band based on the estimated noise signal for each frequency band,
wherein the superimposition unit uses the comfort noise as a threshold value and superimposes the comfort noise on the suppressed signal only in a frequency band in which the magnitude of the suppressed signal falls below the comfort noise.

4. A non-transitory computer readable medium storing an echo suppression program provided in a transmitting side signal path which transmits a signal input from a microphone of a terminal including a speaker and the microphone, the echo suppression program causing a computer to execute steps of:
removing an echo from the input signal to generate an echo-removed signal;
estimating a noise signal included in the echo-removed signal to generate an estimated noise signal;
suppressing the noise signal included in the echo-removed signal based on the estimated noise signal to generate a suppressed signal;
generating a comfort noise based on the estimated noise signal;
superimposing the comfort noise on the suppressed signal;
converting the echo-removed signal into a function of a frequency domain;
converting a signal generated by a superimposition unit into a function of a time domain,
generating the estimated noise signal for each frequency band based on the echo-removed signal converted into the function of the frequency domain by the converter,
generating the comfort noise for each frequency band based on the estimated noise signal for each frequency band,
wherein the superimposition unit uses the comfort noise as a threshold value and superimposes the comfort noise on the suppressed signal only in a frequency band in which the magnitude of the suppressed signal falls below the comfort noise.

* * * * *